United States Patent
Afanasiev et al.

(10) Patent No.: US 9,926,487 B2
(45) Date of Patent: Mar. 27, 2018

(54) POLYMER PROPPANT WITH INCREASED THERMAL RESISTANCE AND METHOD FOR PRODUCING SAME

(71) Applicant: OTKRYTOE AKTSYONERNOE OBSCHESTVO "ROSNEFT OIL COMPANY", Moscow (RU)

(72) Inventors: Vladimir Vladimirovich Afanasiev, Moscow (RU); Sergey Anatolievich Alkhimov, Moscow (RU); Nataliya Borisovna Bespalova, Moscow (RU); Egor Vladimirovich Shutko, Moscow (RU); Tatyana Modestovna Yumasheva, Moscow (RU); Igor Alekseevich Kiselev, Moscow (RU); Olga Vasilievna Masloboyschikova, Moscow (RU)

(73) Assignee: OTKRYTOE AKTSYONERNOE OBSCHESTVO "ROSNEFT OIL COMPANY", Moscow (RU)

( * ) Notice: Subject to any disclaimer, the term of this patent is extended or adjusted under 35 U.S.C. 154(b) by 0 days.

(21) Appl. No.: 14/786,607

(22) PCT Filed: May 13, 2014

(86) PCT No.: PCT/RU2014/000338
§ 371 (c)(1),
(2) Date: Oct. 23, 2015

(87) PCT Pub. No.: WO2014/185822
PCT Pub. Date: Nov. 20, 2014

(65) Prior Publication Data
US 2016/0060510 A1  Mar. 3, 2016

(30) Foreign Application Priority Data

May 15, 2013 (RU) .................................. 2013122088

(51) Int. Cl.
*C09K 8/80* (2006.01)
*C08F 232/06* (2006.01)
*C08F 220/18* (2006.01)

(52) U.S. Cl.
CPC .............. *C09K 8/80* (2013.01); *C08F 232/06* (2013.01); *C08F 220/18* (2013.01)

(58) Field of Classification Search
CPC .......... C09K 8/80; C09K 21/02; C09K 8/524; C09K 8/54; C09K 3/1463; C09K 8/605; C09K 8/805; C09K 11/06; C09K 11/025; C09K 11/665; C09K 2208/10; C09K 8/467; C09K 8/62; C09K 8/92; C09K 8/68; C09K 8/70; C09K 2208/08; C09K 8/60; E21B 33/138; E21B 43/267; E21B 43/26

See application file for complete search history.

(56) References Cited

U.S. PATENT DOCUMENTS

| | | | |
|---|---|---|---|
| 4,068,718 A | 1/1978 | Cooke, Jr. et al. | |
| 4,668,645 A | 5/1987 | Khaund | |
| 4,668,654 A | 5/1987 | Drake | |
| 7,931,087 B2 | 4/2011 | Gupta | |
| 2011/0083850 A1* | 4/2011 | Barmatov ............... | C09K 8/80 166/280.1 |
| 2012/0145390 A1 | 6/2012 | Parse et al. | |
| 2012/0205101 A1 | 8/2012 | Pribytkov et al. | |
| 2012/0247335 A1 | 10/2012 | Stutzman et al. | |
| 2013/0045901 A1 | 2/2013 | Bicerano | |

FOREIGN PATENT DOCUMENTS

| | | |
|---|---|---|
| CN | 1045267 A | 9/1990 |
| CN | 101489975 A | 7/2009 |
| EA | 000643 B1 | 12/1999 |
| EP | 0385556 A2 | 9/1990 |
| EP | 2452958 A1 | 5/2012 |
| JP | 2012532954 A | 12/2012 |

(Continued)

OTHER PUBLICATIONS

The State Intellectual Property Office of the People's Republic of China First Office Action and Search Report issued in Chinese Patent Application No. 2014800229199, dated Sep. 22, 2017. [Chinese language].

The State Intellectual Property Office of the People's Republic of China First Office Action and Search Report issued in Chinese Patent Application No. 2014800229199, dated Sep. 22, 2017. [English language translation].

*Primary Examiner* — Kumar R Bhushan
(74) *Attorney, Agent, or Firm* — Mintz, Levin, Cohn, Ferris, Glovsky and Popeo, P.C.

(57) ABSTRACT

The increased thermal strength polymer proppant and method for producing the same relate to the oil and gas production technology using materials of high-molecular compounds, especially to proppants of polymer materials with high requirements for the physical and mechanical characteristics, utilized as propping granules in the oil and gas production by a method of hydraulic fracturing. The proppant is made of a metathesis-radically cross-linked mixture of oligocyclopentadienes and methylcarboxy norbornene esters. The proppant represents microspheres having a roundness and sphericity of at least 0.9 for no less than 80% by weight, whose average size being in the range 0.25-1.1 mm and a bulk density being in the range of 0.5-0.7 g/cm$^3$. The technical result is an increase in thermal strength of the proppant material, providing for a compressive strength of at least 150 MPa at a temperature of not less than 100° C.

3 Claims, No Drawings

(56) References Cited

FOREIGN PATENT DOCUMENTS

| | | | |
|---|---|---|---|
| RU | 2168518 | C2 | 6/2001 |
| RU | 2386025 | C1 | 4/2010 |
| RU | 2402572 | * | 10/2010 |
| RU | 2402572 | C1 | 10/2010 |
| RU | 2465286 | C2 | 10/2012 |
| WO | WO-2008/002066 | A1 | 1/2008 |

* cited by examiner

POLYMER PROPPANT WITH INCREASED THERMAL RESISTANCE AND METHOD FOR PRODUCING SAME

This application is a U.S. national-phase entry of Patent Cooperation Treaty Application No. PCT/RU2014/000338, which has an international filing date of May 13, 2014, and claims the priority of Russian Patent Application No. 2013122088, filed May 15, 2013. The specifications, claims, and figures of both the PCT and Russian applications are incorporated herein by reference in their entireties.

TECHNICAL FIELD

The invention relates to the oil and gas production technology using materials of high-molecular compounds, namely, to proppants of polymer materials with high requirements for physical and mechanical properties, used as propping granules in the oil and gas production by a technique of hydraulic fracturing of formation.

BACKGROUND ART

A method of hydraulic fracturing of formation (HFF) consists in high pressure pumping a fluid into oil- and gas-bearing formations, thus facilitating the creation of fractures in the formation through which the oil or gas is flowing. To prevent the fracture healing, hard particles, generally, spherical pellets/granules called as proppants that fill the created fractures together with the carrier fluid, are admixed into the fluid being pumped. The proppants should withstand high formation pressures, be resistive to aggressive environments, and retain the physical and mechanical properties at high temperatures. Meanwhile, the proppant should have a density close to the carrier fluid density in order to be present in the fluid in suspended state and to be delivered to most remote fracture sites. Taking into account that water is most frequently used as the fluid for hydraulic fracturing, the proppant density should be close to the water density.

Mineral materials of the natural origin, such as bauxites, kaolins and sands, are frequently used as an initial material for the production of proppants (U.S. Pat. Nos. 4,068,718 and 4,668,645).

It is known to use various materials, such as a borosilicate or calcinated glass, ferrous and non-ferrous metals or alloys thereof, metal oxides, oxides, nitrides and carbides of silicon, for the production of proppants having a shape of hollow pellets (US patent application No. 2012/0145390).

Disadvantages of these materials are a high technological complexity of production of the hollow pellets therefrom, their insufficient compression strength due to the hollow structure and the material fragility, a high degree of proppant breakdown in fractures, and a reverse carry-over of particles and their fragments.

Technical solutions for the production of proppants with a polymeric coating are aimed at the removal of such disadvantages. Such cover works as a compensator of point stresses, thereby more uniformly distributing the pressure throughout the proppant surface and volume, and, moreover, reduces the average proppant density. Widely known is the use of various organic polymeric and non-organic proppant coatings in the form of epoxy and phenol resins (US patent applications Nos. 2012/0205101, 2012/247335).

Disadvantages of these technical solutions are the complexity of producing such proppants, insufficient thermal resistance of the coatings, low ovality and sphericity factors due to the shape of mineral proppant core, and a high spread of physical and mechanical characteristics.

It is known to use a wide spectrum of thermosetting polymers with cross-linkages such as epoxy, vinyl and phenol compounds, polyurethane, polyester, melamine, etc., as the material for producing proppants (US patent application No. 2013/0045901).

Known is the use of polyamide as the material for producing proppants (U.S. Pat. No. 7,931,087).

A disadvantage of the known materials is an inconformity of physical and mechanical properties of these materials simultaneously with the entire combination of requirements applicable to proppant materials. For instance, this is referred to an insufficient resistance to aggressive environments, an insufficient thermal resistance and thermal strength, degree of swelling in liquid hydrocarbons media, compression strength.

A closest technical solution to the proposed one is the use of polydicyclopentadiene as the material for proppant (RU patent No. 2386025).

Disadvantage of the use of polydicyclopentadiene is an insufficient temperature resistance and compression strength and an insufficient oil resistance.

DISCLOSURE OF THE INVENTION

An objective of the present invention is to obtain a material having a set of properties required for the proppants operating in heavy conditions.

A technical result achieved by implementation of the present invention is in enhancing a thermal strength of the proppant material which provides a compressive strength of at least 150 MPa at a temperature of not lower than 100° C., and also in improving geometric characteristics of the proppant, expressed in a sphericity of not less than 0.9 for the proppant granules whose average size is in the range of 0.25-1.1 mm, and also in a bulk density in the range of 0.5-0.7 g/cm$^3$.

The technical result is achieved by that the proppant represents microspheres obtained by a method including mixing dicyclopentadiene with at least one of methacrylic esters selected from the group: allyl methacrylate (AMA), glycidyl methacrylate (GMA), ethylene glycol dimethacrylate (EGDMA), diethylene glycol dimethacrylate (DEGDMA), butylene glycol dimethacrylate (BGDMA), 2-hydroxyethyl methacrylate (HEMA), 2-hydroxypropyl methacrylate (HPMA), tricyclodecane dimethanol dimethacrylate (TCDDMA), ethoxylated bisphenol A dimethacrylate (E2BADMA), trimethylolpropane trimethacrylate (TMPTMA), and with at least one of polymer stabilizers as which the following compounds are used (note that the relevant abbreviations are indicated in round parenthesis after each compound name): tetrakis[methylene(3,5-di-tert-butyl-4-hydroxyhydrocinnamate)]methane (1010), 2,6-di-tert-butyl-4-(dimethylamino)phenol (703), 1,3,5-trimethyl-2,4,6-tris(3,5-di-tert-butyl-4-hydroxybenzyl)benzene (330), tris(4-tert-butyl-3-hydroxy-2,6-dimethylbenzyl)isocyanurate (14), 3,5-di-tert-butyl-4-hydroxyanisole (354), 4,4'-methylenebis(2,6-di-tert-butylphenol) (702), diphenylamine (DPA), para-di-tert-butylphenylenediamine (5057), N,N'-diphenyl-1,4-phenylenediamine (DPPD), tris(2,4-di-tert-butylphenyl)phosphite (168), tris(nonylphenyl)phosphite (TNPP), bis(2,2,6,6-tetramethyl-4-piperidinyl)sebacate (770), bis(1-octyloxy-2,2,6,6-tetramethyl-4-piperidinyl)sebacate (123), bis(1-methyl-2,2,6,6-tetramethyl-4-piperidinyl)sebacate (292), 2-tert-butyl-6-(5-chloro-2H-benzotriazol-2-yl)-4-methylphenol (327), 2-(2H-benzotriazol-2-yl)-

4,6-bis(1-methyl-1-phenyl)phenol (234); heating the initial mixture up to a temperature of 150-220° C. and holding at this temperature for 15-360 minutes, followed by cooling down to 20-50° C.; successively introducing, into the resultant mixture of oligocyclopentadienes and methylcarboxy norbornene esters, at least one of radical initiators selected from the group (note that the relevant abbreviations are indicated in round parenthesis after each compound name): di-tert-butyl peroxide (B), dicumyl peroxide (BC-FF), 2,3-dimethyl-2,3-diphenylbutane (30), triphenylmethane (TPM), and a catalyst as which a compound of the following general formula is used:

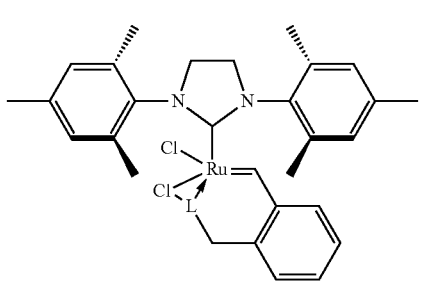

wherein a substituent L is selected from the group:

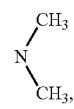

N

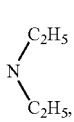

N1

N2

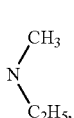

N3

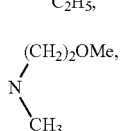

N4

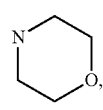

N5

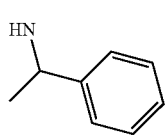

N5b

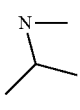

N1a

-continued

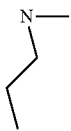

N6a

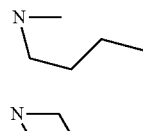

N11a

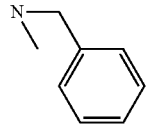

N16a

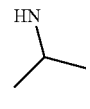

N1b

N2a

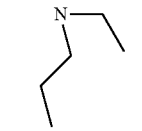

N7a

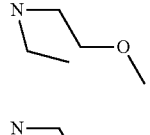

N12a

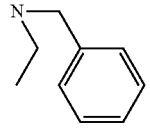

N17a

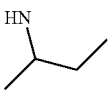

N2b

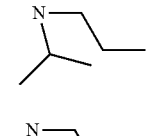

N3a

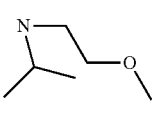

N8a

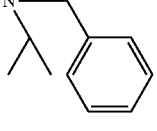

N13a

N18a

-continued

| | |
|---|---|
| 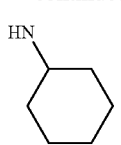 | N3b |
| 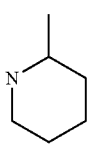 | N4a |
| 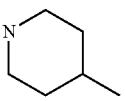 | N9a |
| 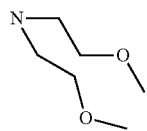 | N14a |
| 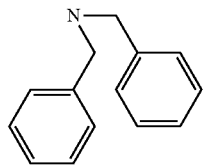 | N19a |
| 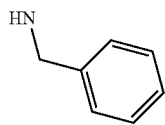 | N4b |
| 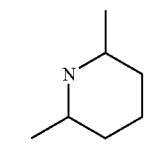 | N5a |
| 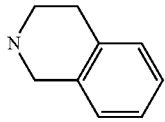 | N10a |
| 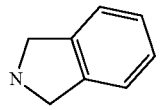 | N15a |
| 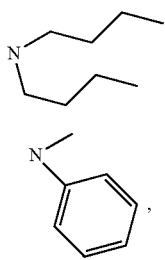 | N20a |
| | N1c | the resulting liquid polymer matrix is held at a temperature of 0-50° C. for 1-40 minutes, and thereafter is introduced as a laminar flow into water containing a surfactant and preheated to a temperature not lower than that of the matrix while constantly stirring, the formed microspheres are separated from the liquid, are heated in an inert gas atmosphere to a temperature of 150-340° C. and are held in said atmosphere and at this temperature for 1-360 minutes.

The components of the polymer matrix are present in the following amounts, wt. %:
 the polymer stabilizers 0.1-3;
 the radical initiators 0.1-4;
 the catalyst 0.002-0.02;
 the mixture of oligocyclopentadienes and methylcarboxy norbornene esters being the balance.

Cetyltrimethylammonium chloride or sodium dodecyl sulfate or ammonium lauryl sulfate or sodium lauryl sarcosinate or octenidine hydrochloride or benzalkonium chloride are used as the surfactant.

These characteristic features are essential.

Use of the above catalysts provides for polymerization of the claimed mixture of monomers in the liquid medium under predetermined processing conditions at which a high uniformity and high compressive strength of the produced microspheres are attained, whereas use of the aforesaid surfactants at the specified temperatures in combination with the polymer blend composition provides a high yield of the final product and desired characteristics of the sphericity and roundness. A polymer proppant made of metathesis-radically cross-linked mixture of oligocyclopentadienes and methylcarboxy norbornene esters obtained by using simultaneously metathesis catalysts and radical initiators has a substantially higher glass transition temperature exceeding 340° C., and better mechanical characteristics as compared to polydicyclopentadiene that has a glass transition temperature not higher than 170° C., a compression strength no more than 70 MPa, and swelling in oil of 10-40%. For some metathesis-radically cross-linked samples, the glass transition temperature exceeds 350° C. and cannot be determined because it approaches to the polymer destruction onset temperature, and the compressive strength increases up to 260 MPa. A value of linear thermal expansion coefficient is decreased. An extremely important property here is the resistance to organic solvents and, for some samples of the present material, a percentage of swelling in oil after holding for a week at 100° C. does not exceed 1%. In comparison with polydicyclopentadiene, this material has a significantly higher compressive strength under high temperature conditions, which is particularly important when using the proppants.

BEST MODE FOR CARRYING OUT THE INVENTION

Dicyclopentadiene (DCPD) is mixed with methacrylic esters and polymer stabilizers, an oligomerization of the dicyclopentadiene in presence of the methacrylic esters and the stabilizers is carried out at a temperature of 150-220° C. for 5-360 minutes. The following compounds or mixtures thereof are used as the methacrylic esters (in parentheses after the name of each compound, their abbreviations are indicated): allyl methacrylate (AMA), glycidyl methacrylate (GMA), ethylene glycol dimethacrylate (EGDMA), diethylene glycol dimethacrylate (DEGDMA), butylene glycol dimethacrylate (BGDMA), 2-hydroxyethyl methacrylate (HEMA), 2-hydroxypropyl methacrylate (HPMA), tricyclodecane dimethanol dimethacrylate (TCDDMA), ethoxylated bisphenol A dimethacrylate (E2BADMA), trimethylolpropane trimethacrylate (TMPTMA). The process proceeds in two directions: an oligomerization of dicyclopentadiene and an interaction of methacrylate with cyclopentadiene:

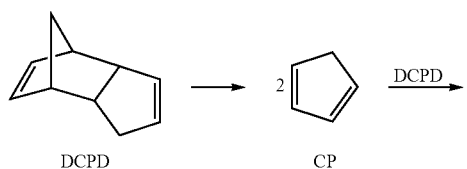

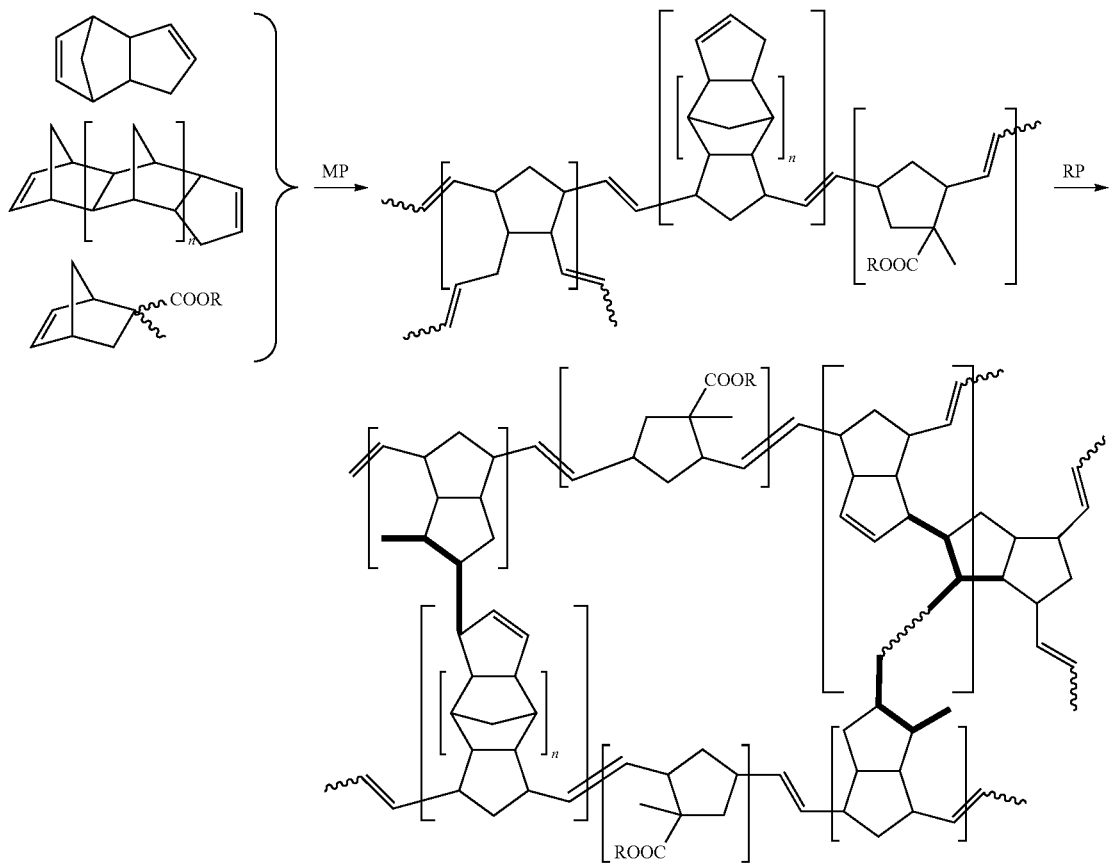

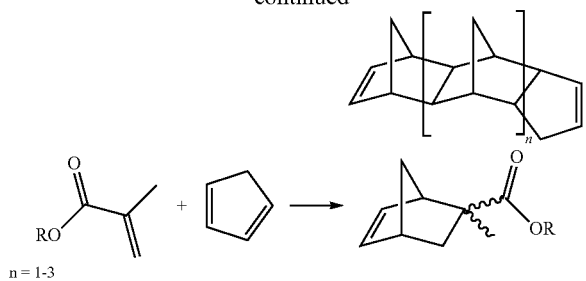

n = 1-3

As a result, a mixture of oligocyclopentadienes (OCPD) containing, inter alia, trimers and tetramers of cyclopentadiene, and of methylcarboxy norbornene esters obtained by the reaction of dicyclopentadiene with methacrylic esters is obtained. Radical initiators (0.1-4 wt. %) and a catalyst (0.002-0.02 wt. %) of the total matrix weight are sequentially introduced into the mixture obtained. This polymer matrix is held at a temperature of 0-50° C. for 1-40 minutes, and thereafter is introduced as a laminar flow into water preheated to a temperature not lower than that of the matrix while constantly stirring, wherein the water contains a surfactant.

The process of metathesis cross-linking of the matrix is performed while constantly stirring and heating the water up to 50-100° C., while still continuing stirring for 1-60 minutes. Metathesis-radical cross-linking of OCPD with methylcarboxy norbornene esters occurs according to the following scheme:

The formed microspheres are separated from the liquid, are heated in an inert gas atmosphere to a temperature of 150-340° C. and are held at this temperature for 1-360 minutes. Use of an inert gas while heating the proppant granules in the form of microspheres prevents them from oxidation and destruction.

During the stirring process, an emulsion of droplets of the polymer matrix is formed, which droplets are shaped into the proppant granules in the form of microspheres during the polymerization process and under influence of the surfactant.

As a result, the proppant having a roundness and sphericity of at least 0.9 for no less than 80% of the material by weight, whose average size being in the range of 0.25-1.1 mm, and a bulk density being in the range 0.5-0.7 g/cm³ is produced.

The properties of the proppant material are classified according to the following characteristics:

Glass transition temperature (Tg)
A: more than 250° C.
B: 201 to 250° C.
C: 170 to 200° C.
D: less than 170° C.
Compressive strength, MPa
A: more than 250
B: 170 to 249
C: 120 to 169
The target fraction (0.25-1.1 mm), %
A: more than 75
B: 70 to 74
C: less than 70
Swelling in oil (100° C./1 week), %
A: less than 1
B: 1.1 to 3
C: 3.1 to 5.

EXAMPLE EMBODIMENTS OF THE INVENTION

Example 1

In a separate vessel, a solution containing dicyclopentadiene, polymer stabilizers 1010 (0.30 wt. %), 168 (0.40 wt. %) and 770 (0.40 wt. %), and methacrylates GMA (2.00 wt. %) and EGDMA (3.0 wt. %) is prepared. The mixture is heated in an autoclave to 150° C., is held at the predetermined temperature for 180 minutes, and is cooled down to room temperature. A radical initiator BC-FF (2.0 wt. %) is added to the resulting mixture. Catalyst N2a (0.0158 wt. %) is added at 30° C. The resulting mixture is stirred for 20 minutes, and thereafter is introduced as a laminar flow into water heated to 40° C. (a polymer mixture/water ratio being 0.1) containing a surfactant of sodium dodecyl sulfate (0.1 wt. %). While constantly stirring, the water is heated up to 70° C. and is held for 15 minutes. The microspheres are separated, are heated up to 250° C. under a nitrogen atmosphere and are held at this temperature in said atmosphere for 30 minutes. The microspheres thereby produced are as follows: yield of 98%, average size (A), Tg (B), compressive strength (A), sphericity of 0.9, bulk density of 0.6 g/cm$^3$, swelling (C).

Example 2

In a separate vessel, a solution containing dicyclopentadiene, polymer stabilizers 702 (0.50 wt. %), 168 (0.50 wt. %) and 770 (0.50 wt. %), and methacrylate EGDMA (1.00 wt. %) is prepared. The mixture is heated in an autoclave to 160° C., is held at the predetermined temperature for 60 minutes, and is cooled down to room temperature. A radical initiator B (0.1 wt. %) is added to the resulting mixture. Catalyst N (0.0094 wt. %) is added at 35° C. The resulting mixture is stirred for 40 minutes, and thereafter is introduced as a laminar flow into water (a polymer mixture/water ratio being 0.1) containing a surfactant of sodium dodecyl sulfate (0.2 wt. %) at 40° C. While constantly stirring, the water is heated up to 100° C. and is held for 10 minutes. The microspheres formed are separated from the solution, are heated under nitrogen atmosphere up to a temperature of 200° C. and are held at this temperature under this atmosphere for 30 minutes. The microspheres thereby produced are as follows: yield of 97%, average size (A), Tg (C), compressive strength (B), sphericity of 0.9, bulk density of 0.6 g/cm$^3$, swelling (C).

Example 3

In a separate vessel, a solution containing dicyclopentadiene, polymer stabilizers 330 (0.50 wt. %) and 168 (0.50 wt. %), and methacrylates HEMA (3.00 wt. %) and GMA (4.5 wt. %) is prepared. The mixture is heated in an autoclave to 155° C., is held at the predetermined temperature for 240 minutes, and is cooled down to room temperature. A radical initiator BC-FF (1.5 wt. %) is added to the resulting mixture. Catalyst N7a (0.0067 wt. %) is added at 25° C. The resulting mixture is stirred for 10 minutes, and thereafter is introduced as a laminar flow into water (a polymer mixture/water ratio being 0.05) containing a surfactant of cetyltrimethylammonium chloride (0.1 wt. %) at 35° C. The microspheres are separated from the water and are heated under nitrogen atmosphere to 150° C., are held at this temperature under this atmosphere for 20 minutes. The microspheres thereby produced are as follows: yield of 97%, average size (A), Tg (C), compressive strength (B), sphericity of 0.9, bulk density of 0.6 g/cm$^3$, swelling (B).

Example 4

In a separate vessel, a solution containing dicyclopentadiene, polymer stabilizers 1010 (0.02 wt. %), 168 (0.04 wt. %), 770 (0.04 wt. %), and methacrylates EGDMA (0.50 wt. %) and TMPTMA (5.0 wt. %) is prepared. The mixture is heated in an autoclave to 150° C., is held at the predetermined temperature for 160 minutes, and is cooled down to room temperature. A radical initiator B (1.5 wt. %) is added to the resulting mixture. Catalyst N1 (0.0094 wt. %) is added at 50° C. The resulting mixture is stirred for 5 minutes, and thereafter is introduced as a laminar flow into water (a polymer mixture/water ratio being 0.1) containing a surfactant of sodium dodecyl sulfate (0.1 wt. %) at 55° C. While constantly stirring, the water is heated up to 60° C. and is held for 45 minutes. The microspheres are separated, are heated under nitrogen atmosphere to 200° C. and are held at this temperature under this atmosphere for 360 minutes. The microspheres thereby produced are as follows: yield of 89%, average size (A), Tg (C), compressive strength (B), sphericity of 0.9, bulk density of 0.6 g/cm$^3$, swelling (B).

Example 5

In a separate vessel, a solution containing dicyclopentadiene, polymer stabilizers 1010 (0.40 wt. %) and 168 (0.40 wt. %), and methacrylate TMPTMA (0.50 wt. %) is prepared. The mixture is heated in an autoclave to 170° C., is held at the predetermined temperature for 180 minutes, and is cooled down to room temperature. A radical initiator BC-FF (1.0 wt. %) is added to the resulting mixture. Catalyst N2 (0.0123 wt. %) is added at 25° C. The resulting mixture is stirred for 10 minutes, and thereafter is introduced as a laminar flow into water (a polymer mixture/water ratio being 0.15) containing a surfactant of cetyltrimethylammonium chloride (0.2 wt. %) at 35° C. While constantly stirring, the water is heated up to 100° C. and is held for 15 minutes. The microspheres are separated, are heated under nitrogen atmosphere to 270° C. and are held at this temperature under this atmosphere for 45 minutes. The microspheres thereby produced are as follows: yield of 96%, average size (A), Tg (C), compressive strength (A), sphericity of 0.9, bulk density of 0.6 g/cm$^3$, swelling (B).

Example 6

In a separate vessel, a solution containing dicyclopentadiene, polymer stabilizers 1010 (0.40 wt. %), 168 (0.80 wt. %) and 770 (0.40 wt. %), and methacrylate TMPTMA (1.00 wt. %) is prepared. The mixture is heated in an autoclave to 160° C., is held at the predetermined temperature for 180 minutes, and is cooled down to room temperature. Radical initiators BC-FF (1.5 wt. %) and 30 (2.5 wt. %) are added to the resulting mixture. Catalyst N14a (0.0086 wt. %) is added at 25° C. The resulting mixture is stirred for 10 minutes, and thereafter is introduced as a laminar flow into water (a polymer mixture/water ratio being 0.1) containing a surfactant of sodium dodecyl sulfate (0.05 wt. %) at 35° C. While constantly stirring, the water is heated up to 95° C. and is held for 15 minutes. The microspheres are separated, are heated under nitrogen atmosphere to 250° C. and are held at this temperature under this atmosphere for 45 minutes. The microspheres thereby produced are as follows: yield of 98%, average size (A), Tg (B), compressive strength (B), sphericity of 0.9, bulk density of 0.6 g/cm$^3$, and swelling (A).

Example 7

In a separate vessel, a solution containing dicyclopentadiene, polymer stabilizers 702 (0.30 wt. %) and 168 (0.50 wt. %), and methacrylate EGDMA (3.00 wt. %) is prepared. The mixture is heated in an autoclave to 150° C., is held at the predetermined temperature for 60 minutes, and is cooled down to room temperature. A radical initiator B (0.5 wt. %) is added to the resulting mixture. Catalyst N4 (0.0165 wt. %) is added at 25° C. The resulting mixture is stirred for 10 minutes, and thereafter is introduced as a laminar flow into water (a polymer mixture/water ratio being 0.2) containing a surfactant of ammonium lauryl sulfate (0.25 wt. %) at 35° C. While constantly stirring, the water is heated up to 75° C. and is held for 30 minutes. The microspheres are separated, are heated under nitrogen atmosphere to 150° C. and are held at this temperature under this atmosphere for 30 minutes. The microspheres thereby produced are as follows: yield of 95%, average size (B), Tg (C), compressive strength (B), sphericity of 0.9, bulk density of 0.6 g/cm$^3$, swelling (C).

Example 8

In a separate vessel, a solution containing dicyclopentadiene, polymer stabilizers 330 (0.50 wt. %), 168 (0.50 wt. %) and 770 (0.50 wt. %), and methacrylates EGDMA (2.00 wt. %) and GMA (5.0 wt. %) is prepared. The mixture is heated in an autoclave to 160° C., is held at the predetermined temperature for 120 minutes, and is cooled down to room temperature. A radical initiator BC-FF (1.0 wt. %) is added to the resulting mixture. Catalyst N5 (0.0117 wt. %) is added at 10° C. The resulting mixture is stirred for 5 minutes, and thereafter is introduced as a laminar flow into water (a polymer mixture/water ratio being 0.1) containing a surfactant of sodium dodecyl sulfate (0.1 wt. %) at 30° C. While constantly stirring, the water is heated up to 100° C. and is held for 15 minutes. The microspheres are separated, are heated under nitrogen atmosphere to 200° C. and are held at this temperature under this atmosphere for 30 minutes. The microspheres thereby produced are as follows: yield of 97%, average size (A), Tg (C), compressive strength (B), sphericity of 0.9, bulk density of 0.6 g/cm$^3$, swelling (B).

Example 9

In a separate vessel, a solution containing dicyclopentadiene, polymer stabilizers 702 (0.20 wt. %), 168 (0.50 wt. %) and 123 (0.50 wt. %), and methacrylate TCDDMA (1.20 wt. %) is prepared. The mixture is heated in an autoclave to 160° C., is held at the predetermined temperature for 120 minutes, and is cooled down to room temperature. A radical initiator BC-FF (1.0 wt. %) is added to the resulting mixture. Catalyst N15a (0.0104 wt. %) is added at 25° C. The resulting mixture is stirred for 10 minutes, and thereafter is introduced as a laminar flow into water (a polymer mixture/water ratio being 0.1) containing a surfactant of sodium dodecyl sulfate (0.1 wt. %) at 35° C. While constantly stirring, the water is heated up to 70° C. and is held for 60 minutes. The microspheres are separated, are heated under nitrogen atmosphere to 170° C. and are held under this atmosphere at this temperature for 30 minutes. The microspheres thereby produced are as follows: yield of 97%, average size (A), Tg (C), compressive strength (A), sphericity of 0.9, bulk density of 0.6 g/cm$^3$, swelling (C).

Example 10

In a separate vessel, a solution containing dicyclopentadiene, polymer stabilizer 702 (0.10 wt. %), and methacrylate BGDMA (2.50 wt. %) is prepared. The mixture is heated in an autoclave to 160° C., is held at the predetermined temperature for 120 minutes, and is cooled down to room temperature. Radical initiators BC-FF (0.1 wt. %) and 30 (1.5 wt. %) are added to the resulting mixture. Catalyst N1a (0.0032 wt. %) is added at 30° C. The resulting mixture is stirred for 10 minutes, and thereafter is introduced as a laminar flow into water (a polymer mixture/water ratio being 0.1) containing a surfactant of cetyltrimethylammonium chloride (0.1 wt. %) at 40° C. While constantly stirring, the water is heated up to 70° C. and is held for 15 minutes. The microspheres are separated, are heated under nitrogen atmosphere to 280° C. and are held under this atmosphere at this temperature for 1 minute. The microspheres thereby produced are as follows: yield of 90%, average size (C), Tg (C), compressive strength (B), sphericity of 0.9, bulk density of 0.6 g/cm$^3$, and swelling (A).

Example 11

In a separate vessel, a solution containing dicyclopentadiene, polymer stabilizers 1010 (1.50 wt. %), TNPP (1.00 wt. %) and 123 (1.50 wt. %), and methacrylate TCDDMA (20.00 wt. %) is prepared. The mixture is heated in an autoclave to 170° C., is held at the predetermined temperature for 60 minutes, and is cooled down to room temperature. Radical initiators B (2.0 wt. %) and 30 (2.0 wt. %) are added to the resulting mixture. Catalyst N3a (0.0211 wt. %) is added at 25° C. The resulting mixture is stirred for 4 minutes, and thereafter is introduced as a laminar flow into water (a polymer mixture/water ratio being 0.1) containing a surfactant of cetyltrimethylammonium chloride (0.3 wt. %) at 40° C. While constantly stirring, the water is heated up to 100° C. and is held for 15 minutes. The microspheres are separated, are heated under nitrogen atmosphere to 260° C. and are held under this atmosphere at this temperature for 40 minutes. The microspheres thereby produced are as follows: yield of 91%, average size (C), Tg (A), compressive strength (B), sphericity of 0.9, bulk density of 0.6 g/cm$^3$, swelling (A).

Example 12

In a separate vessel, a solution containing dicyclopentadiene, polymer stabilizers DPA (0.40 wt. %), 168 (0.50 wt. %) and 234 (0.20 wt. %), and methacrylate E2BADMA (6.00 wt. %) is prepared. The mixture is heated in an autoclave to 150° C., is held at the predetermined temperature for 60 minutes, and is cooled down to room temperature. A radical initiator B (1.0 wt. %) is added to the resulting mixture. Catalyst N5a (0.0123 wt. %) is added at 10° C. The resulting mixture is stirred for 2 minutes, and thereafter is introduced as a laminar flow into water (a polymer mixture/water ratio being 0.1) containing a surfactant of sodium lauryl sarcosinate (0.1 wt. %) at 35° C. While constantly stirring, the water is heated up to 80° C. and is held for 1 minute. The microspheres are separated, are heated under nitrogen atmosphere to 200° C. and are held under this atmosphere at this temperature for 30 minutes. The microspheres thereby produced are as follows: yield of 94%, average size (A), Tg (C), compressive strength (A), sphericity of 0.9, bulk density of 0.6 g/cm³, swelling (C).

Example 13

In a separate vessel, a solution containing dicyclopentadiene, polymer stabilizers 1010 (0.20 wt. %), 168 (0.50 wt. %) and 292 (0.50 wt. %), and methacrylate TMPTMA (2.50 wt. %) is prepared. The mixture is heated in an autoclave to 180° C., is held at the predetermined temperature for 60 minutes, and is cooled down to room temperature. Radical initiators B (1.0 wt. %) and 30 (3.0 wt. %) are added to the resulting mixture. Catalyst N19a (0.0243 wt. %) is added at 0° C. The resulting mixture is stirred for 1 minute, and thereafter is introduced as a laminar flow into water (a polymer mixture/water ratio being 0.1) containing a surfactant of cetyltrimethylammonium chloride (0.1 wt. %) at 30° C. While constantly stirring, the water is heated up to 50° C. and is held for 40 minutes. The microspheres are separated, are heated under nitrogen atmosphere to 265° C. and are held under this atmosphere at this temperature for 60 minutes. The microspheres thereby produced are as follows: yield of 93%, average size (C), Tg (A), compressive strength (B), sphericity of 0.9, bulk density of 0.6 g/cm³, swelling (A).

Example 14

In a separate vessel, a solution containing dicyclopentadiene, polymer stabilizers 1010 (0.50 wt. %) and 168 (0.50 wt. %), and methacrylates GMA (1.50 wt. %) and HPMA (3.0 wt. %) is prepared. The mixture is heated in an autoclave to 150° C., is held at the predetermined temperature for 60 minutes, and is cooled down to room temperature. Radical initiators B (1.0 wt. %) and 30 (1.0 wt. %) are added to the resulting mixture. Catalyst N6a (0.0058 wt. %) is added at 25° C. The resulting mixture is stirred for 10 minutes, and thereafter is introduced as a laminar flow into water (a polymer mixture/water ratio being 0.1) containing a surfactant of cetyltrimethylammonium chloride (0.1 wt. %) at 35° C. While constantly stirring, the water is heated up to 80° C. and is held for 15 minutes. The microspheres are separated, are heated under nitrogen atmosphere to 300° C. and are held under this atmosphere at this temperature for 30 minutes. The microspheres thereby produced are as follows: yield of 97%, average size (B), Tg (A), compressive strength (C), sphericity of 0.9, bulk density of 0.6 g/cm³, swelling (A).

Example 15

In a separate vessel, a solution containing dicyclopentadiene, polymer stabilizers 1010 (0.40 wt. %), TNPP (0.40 wt. %) and 770 (0.40 wt. %), and methacrylate EGDMA (0.50 wt. %) is prepared. The mixture is heated in an autoclave to 200° C., is held at the predetermined temperature for 60 minutes, and is cooled down to room temperature. A radical initiator BC-FF (1.0 wt. %) is added to the resulting mixture. Catalyst N8a (0.0103 wt. %) is added at 25° C. The resulting mixture is stirred for 10 minutes, and thereafter is introduced as a laminar flow into water (a polymer mixture/water ratio being 0.15) containing a surfactant of cetyltrimethylammonium chloride (0.2 wt. %) at 35° C. While constantly stirring, the water is heated up to 70° C. and is held for 15 minutes. The microspheres are separated, are heated under nitrogen atmosphere to 170° C. and are held under this atmosphere at this temperature for 240 minutes. The microspheres thereby produced are as follows: yield of 98%, average size (C), Tg (C), compressive strength (B), sphericity of 0.9, bulk density of 0.6 g/cm³, swelling (C).

Example 16

In a separate vessel, a solution containing dicyclopentadiene, polymer stabilizers 168 (0.40 wt. %), 168 (0.40 wt. %) and 770 (0.40 wt. %), and methacrylate E2BADMA (18.00 wt. %) is prepared. The mixture is heated in an autoclave to 150° C., is held at the predetermined temperature for 240 minutes, and is cooled down to room temperature. Radical initiators BC-FF (1.0 wt. %) and TPM (1.0 wt. %) are added to the resulting mixture. Catalyst N9a (0.0019 wt. %) is added at 15° C. The resulting mixture is stirred for 10 minutes, and thereafter is introduced as a laminar flow into water (a polymer mixture/water ratio being 0.01) containing a surfactant of cetyltrimethylammonium chloride (0.1 wt. %) at 35° C. While constantly stirring, the water is heated up to 90° C. and is held for 15 minutes. The microspheres are separated, are heated under nitrogen atmosphere to 270° C. and are held under this atmosphere at this temperature for 145 minutes. The microspheres thereby produced are as follows: yield of 97%, average size (B), Tg (C), compressive strength (B), sphericity of 0.9, bulk density of 0.6 g/cm³, swelling (C).

Example 17

In a separate vessel, a solution containing dicyclopentadiene, polymer stabilizers 1010 (0.45 wt. %) and 168 (0.45 wt. %), and methacrylates TCDDMA (0.80 wt. %) and TMPTMA (5.0 wt. %) is prepared. The mixture is heated in an autoclave to 160° C., is held at the predetermined temperature for 360 minutes, and is cooled down to room temperature. A radical initiator BC-FF (0.5 wt. %) is added to the resulting mixture. Catalyst N10a (0.0068 wt. %) is added at 5° C. The resulting mixture is stirred for 10 minutes, and thereafter is introduced as a laminar flow into water (a polymer mixture/water ratio being 0.3) containing a surfactant of cetyltrimethylammonium chloride (0.2 wt. %) at 35° C. While constantly stirring, the water is heated up to 95° C. and is held for 5 minutes. The microspheres are separated, are heated under nitrogen atmosphere to 170° C. and are held under this atmosphere at this temperature for 30 minutes. The microspheres thereby produced are as follows: yield of 98%, average size (B), Tg (C), compressive strength (B), sphericity of 0.9, bulk density of 0.6 g/cm³, swelling (C).

Example 18

In a separate vessel, a solution containing dicyclopentadiene, polymer stabilizers 702 (0.45 wt. %) and 168 (0.45 wt. %), and methacrylate EGDMA (2.00 wt. %) is prepared. The mixture is heated in an autoclave to 160° C., is held at the predetermined temperature for 160 minutes, and is cooled down to room temperature. A radical initiator BC-FF (0.5 wt. %) is added to the resulting mixture. Catalyst N11a (0.0100 wt. %) is added at 25° C. The resulting mixture is stirred for 10 minutes, and thereafter is introduced as a laminar flow into water (a polymer mixture/water ratio being 0.1) containing a surfactant of cetyltrimethylammonium chloride (0.1 wt. %) at 35° C. While constantly stirring, the water is heated up to 95° C. and is held for 15 minutes. The microspheres are separated, are heated under nitrogen atmosphere to 200° C. and are held under this atmosphere at this temperature for 60 minutes. The microspheres thereby produced are as follows: yield of 99%, average size (A), Tg (D), compressive strength (A), sphericity of 0.9, bulk density of 0.6 g/cm$^3$, swelling (C).

Example 19

In a separate vessel, a solution containing dicyclopentadiene, polymer stabilizers 168 (0.36 wt. %), 168 (0.72 wt. %) and 123 (0.45 wt. %), and methacrylate EGDMA (1.00 wt. %) is prepared. The mixture is heated in an autoclave to 190° C., is held at the predetermined temperature for 50 minutes, and is cooled down to room temperature. Radical initiators BC-FF (0.75 wt. %) and 30 (2.0 wt. %) are added to the resulting mixture. Catalyst N3b (0.0072 wt. %) is added at 30° C. The resulting mixture is stirred for 10 minutes, and thereafter is introduced as a laminar flow into water (a polymer mixture/water ratio being 0.1) containing a surfactant of octenidine hydrochloride (0.1 wt. %) at 40° C. While constantly stirring, the water is heated up to 100° C. and is held for 15 minutes. The microspheres are separated, are heated under nitrogen atmosphere to 250° C. and are held under this atmosphere at this temperature for 30 minutes. The microspheres thereby produced are as follows: yield of 97%, average size (B), Tg (B), compressive strength (B), sphericity of 0.9, bulk density of 0.6 g/cm$^3$, swelling (A).

Example 20

In a separate vessel, a solution containing dicyclopentadiene, polymer stabilizers 1010 (0.35 wt. %), 327 (0.20 wt. %) and 770 (0.50 wt. %), and methacrylates EGDMA (2.00 wt. %) and E2BADMA (3.0 wt. %) is prepared. The mixture is heated in an autoclave to 160° C., is held at the predetermined temperature for 180 minutes, and is cooled down to room temperature. Radical initiators B (0.1 wt. %) and 30 (2.0 wt. %) are added to the resulting mixture. Catalyst N12a (0.0081 wt. %) is added at 25° C. The resulting mixture is stirred for 10 minutes, and thereafter is introduced as a laminar flow into water (a polymer mixture/water ratio being 0.2) containing a surfactant of cetyltrimethylammonium chloride (0.1 wt. %) at 35° C. While constantly stirring, the water is heated up to 95° C. and is held for 15 minutes. The microspheres are separated, are heated under argon atmosphere to 270° C. and are held at this temperature for 30 minutes. The microspheres thereby produced are as follows: yield of 97%, average size (C), Tg (A), compressive strength (B), sphericity of 0.9, bulk density of 0.6 g/cm$^3$, swelling (A).

Example 21

In a separate vessel, a solution containing dicyclopentadiene, polymer stabilizers 1010 (0.50 wt. %) and 168 (0.50 wt. %), and methacrylates EGDMA (2.50 wt. %) and BGDMA (2.50 wt. %) is prepared. The mixture is heated in an autoclave to 155° C., is held at the predetermined temperature for 180 minutes, and is cooled down to room temperature. A radical initiator B (0.1 wt. %) is added to the resulting mixture. Catalyst N3 (0.0095 wt. %) is added at 25° C. The resulting mixture is stirred for 10 minutes, and thereafter is introduced as a laminar flow into water (a polymer mixture/water ratio being 0.1) containing a surfactant of sodium dodecyl sulfate (0.1 wt. %) at 35° C. While constantly stirring, the water is heated up to 75° C. and is held for 20 minutes. The microspheres are separated, are heated under nitrogen atmosphere to 180° C. and are held under this atmosphere at this temperature for 120 minutes. The microspheres thereby produced are as follows: yield of 97%, average size (A), Tg (C), compressive strength (B), sphericity of 0.9, bulk density of 0.6 g/cm$^3$, swelling (C).

Example 22

In a separate vessel, a solution containing dicyclopentadiene, polymer stabilizers 330 (0.45 wt. %), TNPP (0.45 wt. %) and 292 (0.45 wt. %), and methacrylate BGDMA (3.20 wt. %) is prepared. The mixture is heated in an autoclave to 175° C., is held at the predetermined temperature for 180 minutes, and is cooled down to room temperature. A radical initiator B (1.5 wt. %) is added to the resulting mixture. Catalyst N13a (0.0103 wt. %) is added at 25° C. The resulting mixture is stirred for 10 minutes, and thereafter is introduced as a laminar flow into water (a polymer mixture/water ratio being 0.1) containing a surfactant of sodium dodecyl sulfate (0.1 wt. %) at 35° C. While constantly stirring, the water is heated up to 95° C. and is held for 15 minutes. The microspheres are separated, are heated under nitrogen atmosphere to 220° C. and are held under this atmosphere at this temperature for 30 minutes. The microspheres thereby produced are as follows: yield of 97%, average size (A), Tg (B), compressive strength (A), sphericity of 0.9, bulk density of 0.6 g/cm$^3$, swelling (B).

Example 23

In a separate vessel, a solution containing dicyclopentadiene, polymer stabilizers 1010 (0.20 wt. %) and TNPP (0.50 wt. %), and methacrylates DEGDMA (8.00 wt. %) and E2BADMA (5.0 wt. %) is prepared. The mixture is heated in an autoclave to 150° C., is held at the predetermined temperature for 60 minutes, and is cooled down to room temperature. Radical initiators BC-FF (1.0 wt. %) and 30 (2.0 wt. %) are added to the resulting mixture. Catalyst N16a (0.0075 wt. %) is added at 30° C. The resulting mixture is stirred for 1 minute, and thereafter is introduced as a laminar flow into water (a polymer mixture/water ratio being 0.4) containing a surfactant of benzalkonium chloride (0.2 wt. %) at 40° C. While constantly stirring, the water is heated up to 75° C. and is held for 15 minutes. The microspheres are separated, are heated under nitrogen atmosphere to 260° C. and are held at this temperature under this atmosphere for 30 minutes. The microspheres thereby produced are as follows: yield of 95%, average size (C), Tg (A), compressive strength (A), sphericity of 0.9, bulk density of 0.6 g/cm$^3$, swelling (A).

Example 24

In a separate vessel, a solution containing dicyclopentadiene, polymer stabilizers 1010 (0.20 wt. %), 168 (0.50 wt.

%) and 292 (0.50 wt. %), and methacrylates EGDMA (1.00 wt. %) and BGDMA (5.0 wt. %) is prepared. The mixture is heated in an autoclave to 150° C., is held at the predetermined temperature for 240 minutes, and is cooled down to room temperature. Radical initiators B (1.0 wt. %) and 30 (2.0 wt. %) are added to the resulting mixture. Catalyst N17a (0.0083 wt. %) is added at 20° C. The resulting mixture is stirred for 5 minutes, and thereafter is introduced as a laminar flow into water (a polymer mixture/water ratio being 0.1) containing a surfactant of benzalkonium chloride (0.1 wt. %) at 30° C. While constantly stirring, the water is heated up to 50° C. and is held for 10 minutes. The microspheres are separated, are heated under nitrogen atmosphere to 340° C. and are held under this atmosphere at this temperature for 10 minutes. The microspheres thereby produced are as follows: yield of 97%, average size (C), Tg (A), compressive strength (B), sphericity of 0.9, bulk density of 0.6 g/cm$^3$, swelling (A).

Example 25

In a separate vessel, a solution containing dicyclopentadiene, polymer stabilizers 14 (0.40 wt. %), 168 (0.80 wt. %) and 770 (0.40 wt. %), and methacrylates BGDMA (1.00 wt. %) and HPMA (1.0 wt. %) is prepared. The mixture is heated in an autoclave to 220° C., is held at the predetermined temperature for 15 minutes, and is cooled down to room temperature. A radical initiator BC-FF (1.0 wt. %) is added to the resulting mixture. Catalyst N18a (0.0134 wt. %) is added at 10° C. The resulting mixture is stirred for 5 minutes, and thereafter is introduced as a laminar flow into water (a polymer mixture/water ratio being 0.1) containing a surfactant of benzalkonium chloride (0.1 wt. %) at 30° C. While constantly stirring, the water is heated up to 80° C. and is held for 15 minutes. The microspheres are separated, are heated to 200° C. under an argon atmosphere and are held under this atmosphere at this temperature for 30 minutes. The microspheres thereby produced are as follows: yield of 98%, average size (A), Tg (C), compressive strength (B), sphericity of 0.9, bulk density of 0.6 g/cm$^3$, swelling (C).

Example 26

In a separate vessel, a solution containing dicyclopentadiene, polymer stabilizers 702 (0.40 wt. %) and 327 (0.20 wt. %), and methacrylate EGDMA (2.00 wt. %) is prepared. The mixture is heated in an autoclave to 150° C., is held at the predetermined temperature for 60 minutes, and is cooled down to room temperature. A radical initiator BC-FF (1.0 wt. %) is added to the resulting mixture. Catalyst N4a (0.0127 wt. %) is added at 25° C. The resulting mixture is stirred for 10 minutes, and thereafter is introduced as a laminar flow into water (a polymer mixture/water ratio being 0.1) containing a surfactant of cetyltrimethylammonium chloride (0.1 wt. %) at 35° C. While constantly stirring, the water is heated up to 80° C. and is held for 15 minutes. The microspheres are separated, are heated to 200° C. under nitrogen atmosphere and are held under this atmosphere at this temperature for 30 minutes. The microspheres thereby produced are as follows: yield of 92%, average size (A), Tg (C), compressive strength (B), sphericity of 0.9, bulk density of 0.6 g/cm$^3$, swelling (C).

Example 27

In a separate vessel, a solution containing dicyclopentadiene, polymer stabilizers 330 (0.40 wt. %), 168 (0.50 wt. %) and 770 (0.50 wt. %), and methacrylate E2BADMA (25.00 wt. %) is prepared. The mixture is heated in an autoclave to 155° C., is held at the predetermined temperature for 300 minutes, and is cooled down to room temperature. Radical initiators BC-FF (1.0 wt. %) and 30 (1.0 wt. %) are added to the resulting mixture. Catalyst N20a (0.0039 wt. %) is added at 15° C. The resulting mixture is stirred for 10 minutes, and thereafter is introduced as a laminar flow into water (a polymer mixture/water ratio being 0.1) containing a surfactant of octenidine hydrochloride (0.1 wt. %) at 40° C. While constantly stirring, the water is heated up to 70° C. and is held for 15 minutes. The microspheres are separated, are heated under nitrogen atmosphere to 255° C. and are held under this atmosphere at this temperature for 30 minutes. The microspheres thereby produced are as follows: yield of 97%, average size (B), Tg (A), compressive strength (B), sphericity of 0.9, bulk density of 0.6 g/cm$^3$, swelling (A).

Example 28

In a separate vessel, a solution containing dicyclopentadiene, polymer stabilizers 5057 (0.40 wt. %) and TNPP (0.80 wt. %), and methacrylate BGDMA (3.00 wt. %) is prepared. The mixture is heated in an autoclave to 155° C., is held at the predetermined temperature for 300 minutes, and is cooled down to room temperature. A radical initiator B (2.0 wt. %) is added to the resulting mixture. Catalyst N1b (0.0066 wt. %) is added at 30° C. The resulting mixture is stirred for 10 minutes, and thereafter is introduced as a laminar flow into water (a polymer mixture/water ratio being 0.1) containing a surfactant of octenidine hydrochloride (0.1 wt. %) at 40° C. While constantly stirring, the water is heated up to 70° C. and is held for 15 minutes. The microspheres are separated, are heated under nitrogen atmosphere to 200° C. and are held under this atmosphere at this temperature for 120 minutes. The microspheres thereby produced are as follows: yield of 96%, average size (C), Tg (C), compressive strength (A), sphericity of 0.9, bulk density of 0.6 g/cm$^3$, swelling (B).

Example 29

In a separate vessel, a solution containing dicyclopentadiene, polymer stabilizers 354 (1.00 wt. %) and 770 (0.50 wt. %), and methacrylate BGDMA (1.00 wt. %) is prepared. The mixture is heated in an autoclave to 155° C., is held at the predetermined temperature for 300 minutes, and is cooled down to room temperature. Radical initiators BC-FF (1.0 wt. %) and 30 (1.0 wt. %) are added to the resulting mixture. Catalyst N2b (0.0069 wt. %) is added at 45° C. The resulting mixture is stirred for 10 minutes, and thereafter is introduced as a laminar flow into water (a polymer mixture/water ratio being 0.5) containing a surfactant of cetyltrimethylammonium chloride (0.5 wt. %) at 50° C. While constantly stirring, the water is heated up to 70° C. and is held for 15 minutes. The microspheres are separated, are heated under nitrogen atmosphere to 275° C. and are held under this atmosphere at this temperature for 30 minutes. The microspheres thereby produced are as follows: yield of 92%, average size (C), Tg (A), compressive strength (B), sphericity of 0.9, bulk density of 0.6 g/cm$^3$, swelling (A).

Example 30

In a separate vessel, a solution containing dicyclopentadiene, polymer stabilizers 702 (0.37 wt. %), 168 (0.73 wt.

%) and 770 (0.37 wt. %), and methacrylate EGDMA (1.00 wt. %) is prepared. The mixture is heated in an autoclave to 165° C., is held at the predetermined temperature for 240 minutes, and is cooled down to room temperature. A radical initiator BC-FF (1.0 wt. %) is added to the resulting mixture. Catalyst N4b (0.0093 wt. %) is added at 30° C. The resulting mixture is stirred for 10 minutes, and thereafter is introduced as a laminar flow into water (a polymer mixture/water ratio being 0.1) containing a surfactant of sodium dodecyl sulfate (0.5 wt. %) at 40° C. While constantly stirring, the water is heated up to 80° C. and is held for 15 minutes. The microspheres are separated, are heated to 200° C. under nitrogen atmosphere and are held under this atmosphere at this temperature for 60 minutes. The microspheres thereby produced are as follows: yield of 96%, average size (C), Tg (C), compressive strength (A), sphericity of 0.9, bulk density of 0.6 g/cm$^3$, swelling (C).

Example 31

In a separate vessel, a solution containing dicyclopentadiene, polymer stabilizers 703 (0.45 wt. %) and 770 (0.45 wt. %), and methacrylate TMPTMA (1.50 wt. %) is prepared. The mixture is heated in an autoclave to 155° C., is held at the predetermined temperature for 280 minutes, and is cooled down to room temperature. Radical initiators BC-FF (1.0 wt. %) and 30 (1.5 wt. %) are added to the resulting mixture. Catalyst N5b (0.0129 wt. %) is added at 30° C. The resulting mixture is stirred for 10 minutes, and thereafter is introduced as a laminar flow into water (a polymer mixture/water ratio being 0.1) containing a surfactant of cetyltrimethylammonium chloride (0.1 wt. %) at 40° C. While constantly stirring, the water is heated up to 60° C. and is held for 15 minutes. The microspheres are separated, are heated to 260° C. under nitrogen atmosphere and are held at this temperature and under this atmosphere for 30 minutes. The microspheres thereby produced are as follows: yield of 97%, average size (B), Tg (A), compressive strength (B), sphericity of 0.9, bulk density of 0.6 g/cm$^3$, swelling (A).

Example 32

In a separate vessel, a solution containing dicyclopentadiene, polymer stabilizers 1010 (0.37 wt. %), 168 (0.10 wt. %) and 770 (0.47 wt. %), and methacrylates HEMA (2.50 wt. %) and GMA (5.0 wt. %) is prepared. The mixture is heated in an autoclave to 155° C., is held at the predetermined temperature for 280 minutes, and is cooled down to room temperature. Radical initiators BC-FF (1.0 wt. %) and 30 (1.0 wt. %) are added to the resulting mixture. Catalyst N1c (0.0106 wt. %) is added at 20° C. The resulting mixture is stirred for 5 minutes, and thereafter is introduced as a laminar flow into water (a polymer mixture/water ratio being 0.2) containing a surfactant of cetyltrimethylammonium chloride (0.1 wt. %) at 40° C. While constantly stirring, the water is heated up to 80° C. and is held for 15 minutes. The microspheres are separated, are heated under nitrogen atmosphere to 310° C. and are held at this temperature and under this atmosphere for 5 minutes. The microspheres thereby produced are as follows: yield of 93%, average size (C), Tg (A), compressive strength (C), sphericity of 0.9, bulk density of 0.6 g/cm$^3$, swelling (A).

Example 33

In a separate vessel, a solution containing dicyclopentadiene, polymer stabilizer 702 (0.10 wt. %), and methacrylates AMA (0.50 wt. %) and BGDMA (2.50 wt. %) is prepared. The mixture is heated in an autoclave to 160° C., is held at the predetermined temperature for 120 minutes, and is cooled down to room temperature. Radical initiators BC-FF (0.1 wt. %) and 30 (1.5 wt. %) are added to the resulting mixture. Catalyst N1a (0.0032 wt. %) is added at 30° C. The resulting mixture is stirred for 10 minutes, and thereafter is introduced as a laminar flow into water (a polymer mixture/water ratio being 0.1) containing a surfactant of cetyltrimethylammonium chloride (0.1 wt. %) at 40° C. While constantly stirring, the water is heated up to 70° C. and is held for 15 minutes. The microspheres are separated, are heated under argon atmosphere to 280° C. and are held under this atmosphere and at this temperature for 1 minute. The microspheres thereby produced are as follows: yield of 90%, average size (C), Tg (C), compressive strength (B), sphericity of 0.9, bulk density of 0.6 g/cm$^3$, swelling (A).

Example 34

In a separate vessel, a solution containing dicyclopentadiene, polymer stabilizers 702 (0.40 wt. %), 168 (0.40 wt. %) and 770 (0.40 wt. %), and methacrylate E2BADMA (18.00 wt. %) is prepared. The mixture is heated in an autoclave to 150° C., is held at the predetermined temperature for 240 minutes, and is cooled down to room temperature. Radical initiators BC-FF (1.0 wt. %) and TPM (1.0 wt. %) are added to the resulting mixture. Catalyst N9a (0.0019 wt. %) is added at 15° C. The resulting mixture is stirred for 10 minutes, and thereafter is introduced as a laminar flow into water (a polymer mixture/water ratio being 0.01) containing a surfactant of cetyltrimethylammonium chloride (0.1 wt. %) at 35° C. While constantly stirring, the water is heated up to 90° C. and is held for 15 minutes. The microspheres are separated, are heated to 270° C. in nitrogen atmosphere and are held under this atmosphere and at this temperature for 145 minutes. The microspheres thereby produced are as follows: yield of 97%, average size (B), Tg (C), compressive strength (B), sphericity of 0.9, bulk density of 0.6 g/cm$^3$, swelling (C).

Example 35

In a separate vessel, a solution containing dicyclopentadiene, polymer stabilizers DPPD (0.37 wt. %), 168 (0.73 wt. %) and 770 (0.37 wt. %), and methacrylate BGDMA (15.00 wt. %) is prepared. The mixture is heated in an autoclave to 160° C., is held at the predetermined temperature for 240 minutes, and is cooled down to room temperature. Radical initiators BC-FF (1.0 wt. %) and 30 (1.0 wt. %) are added to the resulting mixture. Catalyst N2 (0.0020 wt. %) is added at 15° C. The resulting mixture is stirred for 10 minutes, and thereafter is introduced as a laminar flow into water (a polymer mixture/water ratio being 0.01) containing a surfactant of cetyltrimethylammonium chloride (0.1 wt. %) at 35° C. While constantly stirring, the water is heated up to 100° C. and is held for 15 minutes. The microspheres are separated, are heated to 270° C. in nitrogen atmosphere and are held under this atmosphere and at this temperature for 145 minutes. The microspheres thereby produced are as follows: yield of 96%, average size (B), Tg (B), compressive strength (B), sphericity of 0.9, bulk density of 0.6 g/cm$^3$, swelling (C).

INDUSTRIAL APPLICABILITY

As seen from the examples, the present proppant in terms of its principal physical and mechanical characteristics is best suited for application in hydrocarbon production under heavy conditions using the method of formation hydraulic fracturing.

The invention claimed is:
1. A method for producing an increased thermal strength polymer proppant, including mixing dicyclopentadiene with at least one methacrylic ester selected from the group consisting of allyl methacrylate, glycidyl methacrylate, ethylene glycol dimethacrylate, diethylene glycol dimethacrylate, butylene glycol dimethacrylate, 2-hydroxyethyl methacrylate, 2-hydroxypropyl methacrylate, tricyclodecane dimethanol dimethacrylate, ethoxylated bisphenol A dimethacrylate, and trimethylolpropane trimethacrylate, and with at least one polymer stabilizer selected from the group consisting of tetrakis[methylene(3,5-di-tert-butyl-4-hydroxyhydrocinnamate)]methane, 2,6-di-tert-butyl-4-(dimethylamino)phenol, 1,3,5-trimethyl-2,4,6-tris(3,5-di-tert-butyl-4-hydroxybenzyl)benzene, tris(4-tert-butyl-3-hydroxy-2,6-dimethylbenzyl)isocyanurate, 3,5-di-tert-butyl-4-hydroxyanisole, 4,4'-methylenebis(2,6-di-tert-butylphenol), diphenylamine, para-di-tert-butylphenylenediamine, N,N'-diphenyl-1,4-phenylenediamine, tris(2,4-di-tert-butylphenyl)phosphite, tris(nonylphenyl)phosphite, bis(2,2,6,6-tetramethyl-4-piperidinyl)sebacate, bis(1-octyloxy-2,2,6,6-tetramethyl-4-piperidinyl)sebacate, bis(1-methyl-2,2,6,6-tetramethyl-4-piperidinyl)sebacate, 2-tert-butyl-6-(5-chloro-2H-benzotriazol-2-yl)-4-methylphenol, and 2-(2H-benzotriazol-2-yl)-4,6-bis(1-methyl-1-phenyl)phenol, to obtain an initial mixture; heating the initial mixture to a temperature of 150-220° C. and holding at this temperature for 15-360 minutes, followed by cooling down to 20-50° C., to obtain a mixture of oligocyclopentadienes and methylcarboxy norbornene esters; sequentially introducing, into the mixture of oligocyclopentadienes and methylcarboxy norbornene esters obtained in the heating step, at least one radical initiator selected from the group consisting of di-tert-butyl peroxide, dicumyl peroxide, 2,3-dimethyl-2,3-diphenylbutane, and triphenylmethane, and a catalyst which is a compound of the following general formula:

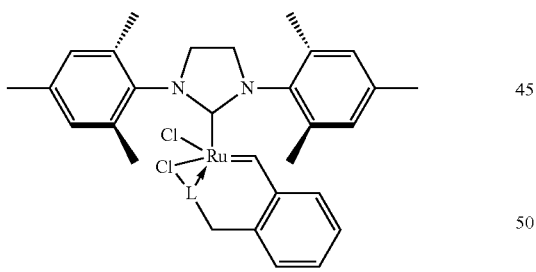

wherein the substituent L is selected from the group consisting of

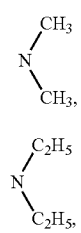 N1

 N2

 N3

(CH₂)₂OMe, N4

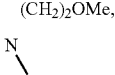

 N5

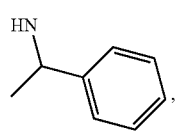 N5b

 N1a

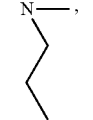 N6a

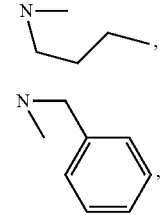 N11a

 N16a

 N1b

 N2a

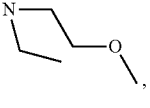 N7a

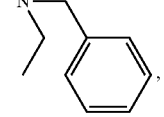 N12a

N17a

-continued

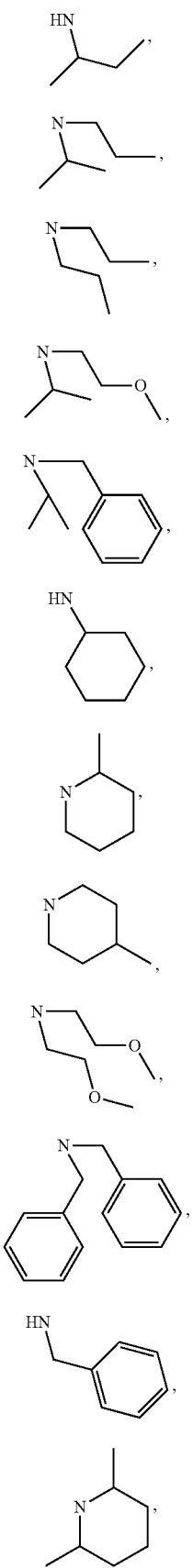

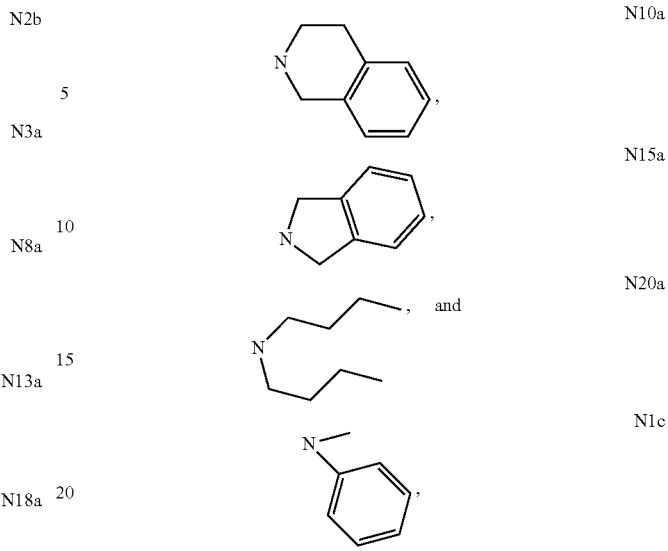

to obtain a polymer matrix,
wherein the components of the polymer matrix are present in the following amounts, wt. %:
the at least one polymer stabilizer 0.1-3;
the at least one radical initiator 0.1-4;
the catalyst 0.002-0.02;
the mixture of oligocyclopentadienes and methylcarboxy norbornene esters being the balance; then
the polymer matrix is held at a temperature of 0-50° C. for 1-40 minutes, and thereafter is introduced as a laminar flow into water preheated to a temperature not lower than that of the polymer matrix while constantly stirring, said water containing a surfactant selected from the group consisting of cetyltrimethylammonium chloride, sodium dodecyl sulfate, ammonium lauryl sulfate, sodium lauryl sarcosinate, octenidine hydrochloride and benzalkonium chloride; while constantly stirring, the water is heated up to 50-100° C., while still continuing stirring for 1-60 minutes, to form microspheres; then the formed microspheres are separated from the water, are heated in an inert gas atmosphere to a temperature of 150-340° C., and are held under this atmosphere and at this temperature for 1-360 minutes.

2. An increased thermal strength polymer proppant, characterized in that it is produced by the method according to claim 1.

3. A method for producing an increased thermal strength polymer proppant, including:
mixing dicyclopentadiene with at least one methacrylic ester selected from the group consisting of ethylene glycol dimethacrylate, butylene glycol dimethacrylate, tricyclodecane dimethanol dimethacrylate, and trimethylolpropane trimethacrylate, and with at least one polymer stabilizer selected from the group consisting of tetrakis[ methylene(3,5-di-tert-butyl-4-hydroxyhydrocinnamate) ] methane, 4,4' -methylenebis(2,6-di-tert-butylphenol), tris(2,4-di-tert-butylphenyl) phosphite, and bis(2,2,6,6-tetramethyl-4-piperidinyl)sebacate, to obtain an initial mixture;
heating the initial mixture to a temperature of 150-220° C and holding at this temperature for 15-360 minutes, followed by cooling down to 20-50° C., to obtain a mixture of oligocyclopentadienes and methylcarboxy norbornene esters;

sequentially introducing, into the mixture of oligocyclopentadienes and methylcarboxy norbornene esters obtained in the heating step, at least one radical initiator selected from the group consisting of di-tert-butyl peroxide, dicumyl peroxide and 2,3-dimethyl-2,3-diphenylbutane, and a catalyst which is a compound of the following general formula:

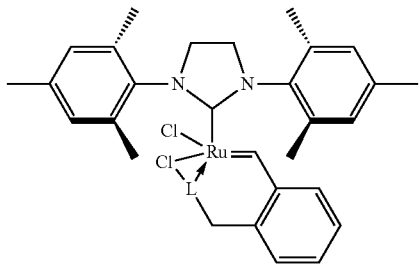

where the substituent L comprises a tertiary amine group, to obtain a polymer matrix, wherein the components of the polymer matrix are present in the following amounts, wt. %:

the at least one polymer stabilizer 0.1-3;

the at least one radical initiator 0.1-4;

the catalyst 0.002-0.02;

the mixture of oligocyclopentadienes and methylcarboxy norbornene esters being the balance; then the polymer matrix is held at a temperature of 0-50° C. for 1-40 minutes, and thereafter is introduced as a laminar flow into water preheated to a temperature not lower than that of the polymer matrix while constantly stirring, said water containing a surfactant; while constantly stirring, the water is heated up to 50-100° C., while still continuing stirring for 1-60 minutes, to form microspheres; then the formed microspheres are separated from the water, are heated in an inert gas atmosphere to a temperature of 150-340° C., and are held under this atmosphere and at this temperature for 1-360 minutes.

* * * * *